US010355800B2

(12) United States Patent
Ruffini et al.

(10) Patent No.: US 10,355,800 B2
(45) Date of Patent: Jul. 16, 2019

(54) MULTI-PATH TIME SYNCHRONIZATION

(71) Applicant: Telefonaktiebolaget LM Ericsson (publ), Stockholm (SE)

(72) Inventors: Stefano Ruffini, Pisa (IT); Teresa Pepe, Pisa (IT); Marzio Puleri, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 22 days.

(21) Appl. No.: 15/523,879

(22) PCT Filed: Nov. 3, 2014

(86) PCT No.: PCT/EP2014/073587
§ 371 (c)(1),
(2) Date: May 2, 2017

(87) PCT Pub. No.: WO2016/070901
PCT Pub. Date: May 12, 2016

(65) Prior Publication Data
US 2017/0331575 A1 Nov. 16, 2017

(51) Int. Cl.
H04J 3/06 (2006.01)
H04L 12/24 (2006.01)
(Continued)

(52) U.S. Cl.
CPC ............ H04J 3/0667 (2013.01); H04J 3/06 (2013.01); H04L 29/08135 (2013.01); H04L 41/12 (2013.01); H04L 41/142 (2013.01); H04L 43/10 (2013.01); H04L 43/00 (2013.01); H04L 43/087 (2013.01); H04L 43/0864 (2013.01); H04L 43/16 (2013.01)

(58) Field of Classification Search
CPC ..... H04J 3/0667; H04J 3/06; H04L 29/08135; H04L 41/12; H04L 41/142; H04L 43/10
USPC ........................................................ 370/503
See application file for complete search history.

(56) References Cited

U.S. PATENT DOCUMENTS 10,063,464 B2 * 8/2018 Ashwood-Smith ..... H04L 45/34
2006/0215577 A1 * 9/2006 Guichard ................ H04L 41/12
370/254

(Continued)

FOREIGN PATENT DOCUMENTS

WO 2015161872 A1 10/2015

OTHER PUBLICATIONS

Ma et al; Efficient Identification of Additive Link Metrics via Network Tomography; 2013; IEEE.*
Hedayat, K. et al., "A Two-Way Active Measurement Protocol (TWAMP)", Network Working Group, Request for Comments 5357, Oct. 2008, 1-26.

(Continued)

Primary Examiner — Christopher R Crompton
(74) Attorney, Agent, or Firm — Patent Portfolio Builders, PLLC

(57) ABSTRACT

The method comprises analyzing (203) probing packets sent on a plurality of end-to-end paths over links of the network. At least one analyzed probing packet is a timing packet comprising timing information for synchronization. The analyzing comprising analyzing probing packets sent on all of a set of probing paths. The set is selected (201) such that the analyzing provides a determination of a performance of each individual link. The method further comprises determining (204) the performance of individual links.

13 Claims, 5 Drawing Sheets

(51) Int. Cl.
*H04L 12/26* (2006.01)
*H04L 29/08* (2006.01)

(56) References Cited

U.S. PATENT DOCUMENTS

| | | | |
|---|---|---|---|
| 2008/0080376 A1* | 4/2008 | Adhikari | H04L 41/0631 370/231 |
| 2011/0122775 A1 | 5/2011 | Zampetti et al. | |
| 2011/0150008 A1* | 6/2011 | Le Pallec | H04L 41/5003 370/503 |
| 2015/0195149 A1* | 7/2015 | Vasseur | H04L 41/5009 370/252 |
| 2015/0381486 A1* | 12/2015 | Xiao | H04L 45/70 370/237 |

OTHER PUBLICATIONS

Mills, D. et al., "Network Time Protocol Version 4: Protocol and Algorithms Specification", Internet Engineering Task Force (IETF) Request for Comments: 5905, Jun. 2010, 1-110.

Mizrahi, Tal, "Slave Diversity: Using Multiple Paths to Improve the Accuracy of Clock Synchronization Protocols", 2012 International IEEE Symposium on Precision Clock Synchronization for Measurement Control and Communication (ISPCS), Sep. 24-28, 2012, 1-6.

Naidu, K. V. et al., "Detecting Anomalies Using End-to-End Path Measurements", IEEE The 27th Conference on Computer Communications (INFOCOM 2008), Apr. 13-18, 2008, 16-20.

Shpiner, A. et al., "Multi-Path Time Synchronization", Network Working Group Internet Draft, Apr. 2013, 1-15.

* cited by examiner

MULTI-PATH TIME SYNCHRONIZATION

TECHNICAL FIELD

Aspects of the invention relate to a method, unit and computer program product for monitoring performance of a network

BACKGROUND

Timing packets are used in packet networks to distribute timing reference information. The protocols most commonly used are Network Time Protocol (NTP) and Precision Time Protocol (PTP), defined in IEEE1588. The timing performance that can be achieved by means of this technology is impacted by packet delay variation (PDV), for example due to congestion in the packet network. This can severely impact the performance of the network, e.g. a mobile network.

Packet timing e.g. using IEEE1588, is used to distribute synchronization to radio base stations. This is used for the basic operations of any radio access technologies, e.g. LTE (Long-Term Evolution) or LTE-Advanced. Frequency synchronization is required; and time synchronization requirements are increasing, for example, to support Time-division duplexing (TDD) or LTE coordination features. IEEE1588 specifies a protocol and a mechanism to distribute timing reference over a packet network.

FIG. 1 shows an example PTP (IEEE1588) network 100. The network 100 comprises different types of clocks, e.g. a Grandmaster clock 101, Ordinary Clocks 102 and Boundary Clocks 103. Timing information is passed between clocks acting as a Master (labelled 'M') 105 and a Slave (labelled 'S') 104. The clocks are arranged to use an exchange of two-way PTP messages to establish a synchronization hierarchy and synchronize to the Grandmaster clock 101 of the network 100.

FIG. 2 shows an example of two-way PTP message exchange 110. A first message 111 or packet is sent from the Master to the Slave at time $t_1$. This is referred to as a Sync message, and may be sent by the master to all the clocks in the domain. A clock receiving this message takes note of the local time $t_2$ when this first message is received.

Optionally, the master subsequently sends a further message 113, referred to as Follow_Up, with an accurate timestamp of $t_1$. This is applicable to a master which is only able to retrieve an accurate timestamp for the Sync transmission from their network hardware after the transmission is complete.

In order to accurately synchronize to their master, clocks must individually determine the network transit time of the Sync messages. The transit time is determined indirectly by measuring round-trip time from each clock to its master. The clocks initiate an exchange with their master designed to measure the transit time. The exchange begins with a clock (slave) sending a Delay_Req message 114 at time $t_3$ to the master. The master receives and timestamps the Delay_Req at time $t_4$ and responds with a Delay_Resp message 115. The master includes the timestamp $t_4$ in the Delay_Resp message.

Through these exchanges a clock learns $t_1$, $t_2$, $t_3$ and $t_4$. The offset between the master and slave clocks is:

$$\text{Offset}=(t_2-t_1+t_3-t_4)/2$$

In particular the distribution of timing via packets in a packet telecommunications network can be done via two main architectures. A first architecture is based on sending packets transparently across the network from a master (e.g. PTP master) to a slave. The master in case of mobile applications is typically located in the Switch site (as shown in FIG. 4) and the slaves are typically integrated in radio base stations. This architecture is suitable to distribute frequency synchronization. A second architecture described by ITU-T G.8275 has been defined specifically to support time synchronization. In this case every node terminates and/or processes the timing packets.

FIG. 3 shows an example of the first architecture for a network 120. A reference clock 121 provides a reference time for a master clock 122. The master clock 122 communicates with one or more slave clocks 123 through a packet network 125. Two-way communication by packets 127 provides for synchronization of the slave clocks. When delivering packets transparently over the network to carry timing information, the PDV created by the network (mainly due to queuing), can severely impact the performance of the service. Especially highly loaded networks (90%-100%) may generate a level of PDV that the slave is not able to tolerate.

The issue is that generally it is not known which links/nodes are actually creating the problem. Redundant masters may allow switching to a better quality reference, if the congestion has not impacted links which are common to both paths.

One way to solve such problem is to deploy extremely accurate and costly oscillators in the slaves.

SUMMARY

In a first aspect of the invention, there is provided a method of monitoring performance of a network comprising analyzing probing packets sent on a plurality of end-to-end paths over links of the network. At least one analysed probing packet is a timing packet comprising timing information for synchronization. The analyzing comprises analyzing probing packets sent on all of a set of probing paths. The set is selected such that the analyzing provides a determination of a performance of each individual link. The method further comprises determining the performance of individual links.

Thus, the performance of each link is determined. This allows a different synchronization path to be identified.

In some examples, the analyzing is by network tomography.

In a second aspect of the invention, there is provided a unit configured to monitor performance of a network. The unit comprises a processing arrangement configured to analyze probing packets sent on a plurality of end-to-end paths over links of the network, wherein at least one analysed probing packet is a timing packet comprising timing information for synchronization. The processing arrangement is configured to analyze probing packets sent on all of a set of probing paths, the set selected such that the analyzing provides a determination of a performance of each individual link. The unit is configured to determine the performance of individual links.

In a third aspect of the invention, there is provided a computer program product, configured when run on a computer to conduct a method according to any one of methods defined in the appended claims.

BRIEF DESCRIPTION OF THE DRAWINGS

Embodiments will now be described by way of example only in relation to the enclosed drawings, in which.

DETAILED DESCRIPTION

Examples of the invention relate to using packet timing technology to synchronize base stations in a network. In some examples, the network is a backhaul network. Aspects of the invention relate to the application of Network Tomography in the network. The network tomography is arranged to identify and isolate the link(s) causing timing issues (e.g. timing flows impacted by too high PDV). The identification of the exact link(s) affected by a problem allows a secondary path to be established between the master and the slave that is not impacted by the same problems. Aspects of the invention monitor a timing performance of the network. In some aspects, the problem affects the performance of a link in handling timing packets carrying timing information for use in synchronization (e.g. using NTP or PTP).

Network Tomography (NT) provides a centralized remote network performance monitoring. An advantage of such an approach is its transparency to the monitored network. NT is technology agnostic, and may be used to monitor multi-technological and multi-domain networks. The timing packets used to distribute timing information are also used to monitor the network, and identify particular links having a problem as part of network tomography.

Network Tomography comprises identifying all the monitoring paths required to infer information about the internal status of the network (termed the identifiability problem).

Figure 1:
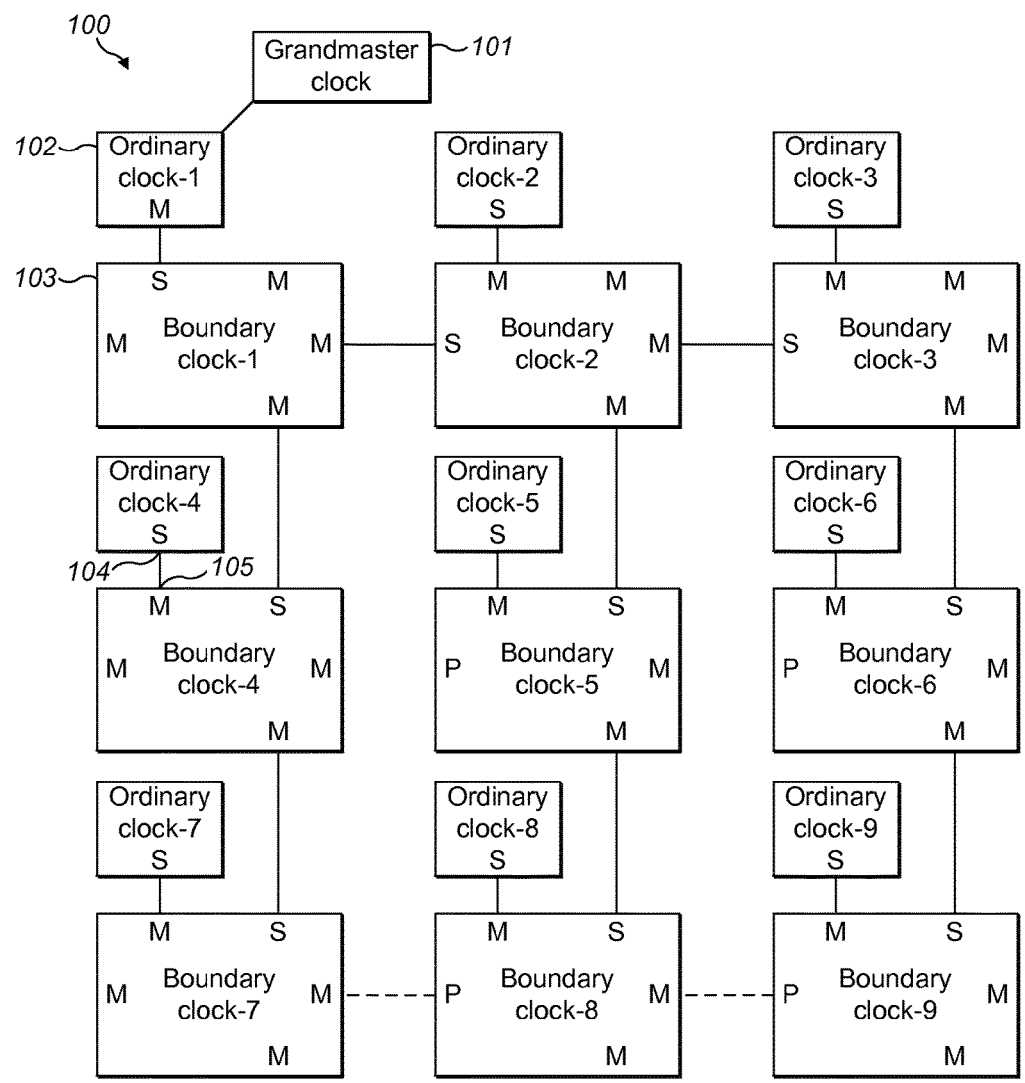
FIG. 1 shows a schematic overview depicting a prior art network.
Figure 2:
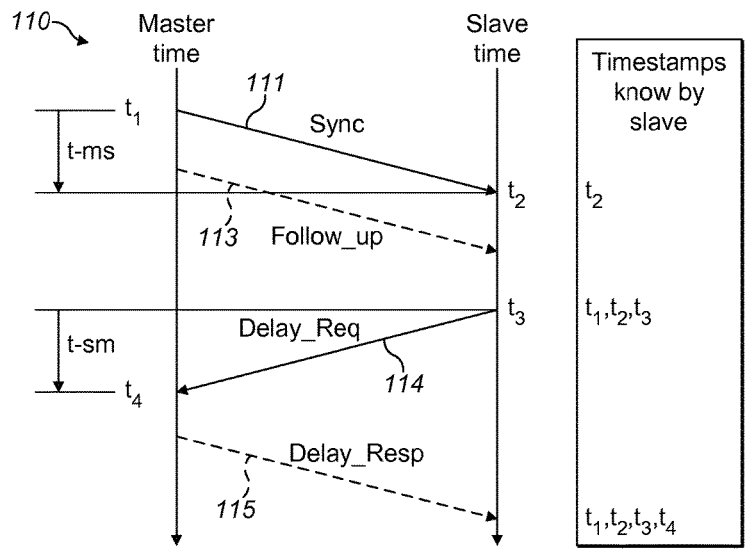
FIG. 2 shows a diagram depicting a prior art message exchange.
Figure 3:
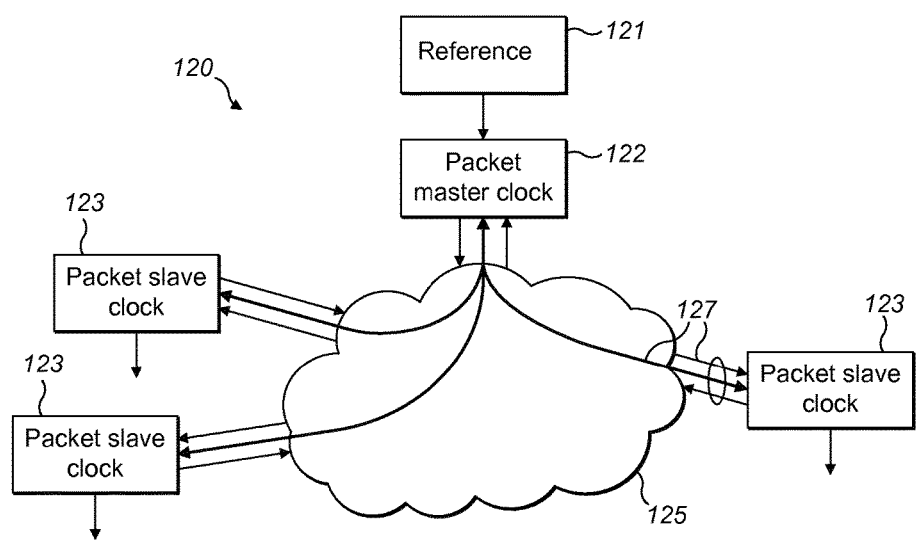
FIG. 3 shows a further schematic overview depicting a prior art network.
Figure 4:
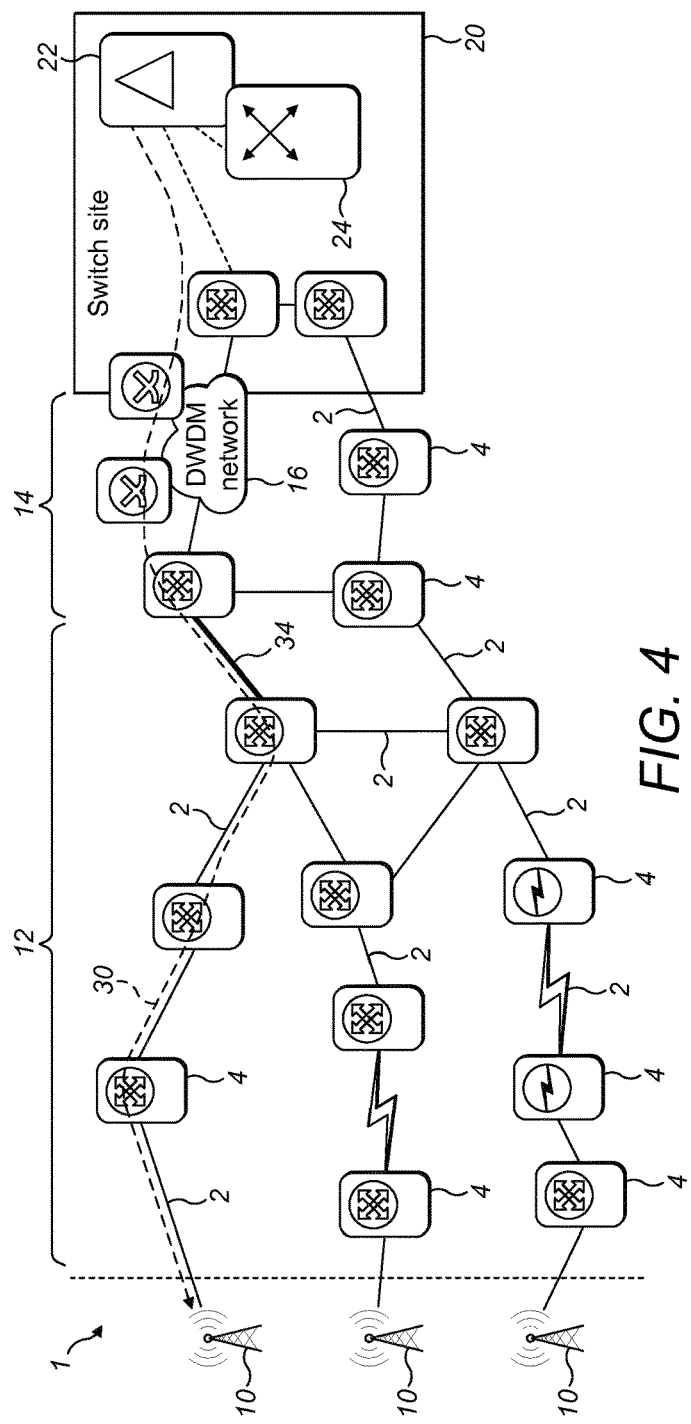
FIG. 4 shows an example of a network according to an example of the present invention.

FIG. 4 shows an example network 1. The network 1 comprises a plurality of links 2 connecting nodes 4. The links 2 may use any type of technology, e.g. optical, microwave or electrical, to communicate with one or more connected node 4. The links 2 of the network 1 connects a plurality of radio base stations 10 to at least one switch site 20.

The network 1 comprises an access network 12, connecting to the radio base stations 10. In some examples, the network 1 further comprises an aggregation network 14, between the access network 12 and the switch site 20. The switch site 20 may be connected to the core network (not shown). The network 1, for example the aggregation network 14, may comprise a Wavelength Division Multiplexed (WDM) network 16, e.g. a Dense WDM (DWDM) network.

The switch site 20 may comprise one or more nodes functioning as routers or switches. The switch site 20 may comprise a source of a reference clock 22. The switch site 20 may further comprise a Radio Network Controller (RNC) or Base Station Controller (BSC) 24. In some examples, the network tomography functions are implemented as part of the RNC or BSC, or as a separate logical or physical entity.

The nodes 4 of the network 1 may function as switches or routers. The arrangement of links 2 between the nodes 4 is such that a plurality of paths are possible between the switch site 20 and radio base stations 10. Communication over the network 1 provides for backhaul between the switch site 20 and radio base stations 10. The switch site 20 may be a physical location or a logical entity, for example, defined at the edge of the access/aggregation network. In some aspects, the switch site is defined as the location of the synchronization master, e.g. central location of the synchronization master. In some aspects, the switch site is defined as the location of one or more of the RNC, BSC, LTE gateway or other LTE nodes.

The radio base station may alternatively be termed a base station, base transceiver station, NodeB or eNodeB. The network 1 is applicable to any type of cellular technology, e.g. GSM, UMTS, LTE, LTE-Advanced.

The network 1 is configured to carry timing packets having timing information between any of the nodes, the switch site 20 and radio base stations 10, for example, in accordance with IEEE1588 (PTP) or NTP. In particular, the timing packets are transmitted between the reference clock 22 and the radio base stations 10. An example path 30 through the network 1 is shown. In some examples, the radio base stations are synchronized using examples of the method and apparatus of the invention. In some examples, a timing reference is used for network performance measurement.

In NTP or IEEE 1588 v2, the timing information is provided by protocol specific packets with hardware-based timestamps in combination with algorithms to determine phase information used to lock a local oscillator. Both NTP and IEEE 1588 v2 are sensitive to PDV.

The network 1 is configured to provide synchronization distribution in a mobile (cellular) network 1. For example, the timing network is based on a unicast communication between a master (reference clock 22) in the switch site 20 and slaves in the RBS sites 10.

In this example, a particular link 34 has a low performance. For example, the PDV of link 34 is too high, i.e. above a threshold. References to a link 34 having a low performance comprises either or both of the link itself and a node associated with that link having the low performance. In particular, the measured parameter (e.g. PDV) is created by the node, and references to a link (e.g. having a PDV) indicates the elements of the node corresponding to that link. The apparatus and method of the present application is arranged to identify the particular link 34 within the network having the low performance, and identify an alternative path that is not affected by the link. In some aspects, the determined performance corresponds to the handling of timing packets by the links. The determined performance of the links corresponds to packet delay variation.

In an example, network tomography is used on the network 1 in order identify a link which is impacting the timing information transmitted in timing messages, e.g. to identify the link within the network 1 having a high PDV. The network tomography functions are controlled or implemented by a network tomography unit or system. The network tomography unit may be a logical entity. The network tomography unit may be combined with another entity, for example in the switch site 20, e.g. RNC/BSC. Alternatively, the network tomography unit may be combined with any other entity, or at any location, connected to the network 1.

The network tomography unit is configured to identify a set of probing paths necessary to monitor network timing performance by network tomography. The probing paths include a number of linearly independent probing (measurement) paths which is equal to (or greater than) the number of links. With this number, link metrics of the network are considered to be uniquely identifiable. For example, K-shortest paths may be generated, and used if a check determines the path is linearly independent to shorter paths. The selected set of probing paths comprises probing paths which are linearly independent, and the number of the linearly independent probing paths is equal to or greater than a number of links in the network.

This step of the network tomography solves the "identifiability" problem to select the suitable set of probing paths. In some examples, a prior analysis to discover the topology is optionally carried out if required.

The network tomography unit is further configured to measure one or more metrics of the network 1 in a measurements collection phase. The measurements collection phase of network tomography may be performed using several approaches. In some examples, network tomography may use both passive and active measurements. For passive measurements, the unit utilizes connections already present in the network to obtain aggregate path-level information. This does not affect traffic load. In some examples, the existing connection is a timing packet, which may also be considered as a probing packet used in the network tomography. The timing packet is carrying timing information as part of a synchronization protocol, e.g. a two-way message exchange protocol such as PTP or NTP. However, the coverage provided by such existing connections will generally not span all the paths necessary to uniquely identify which link in the path is generating a problem (e.g. high PDV).

If the available connections are not sufficient to uniquely identify all link metrics from path measurements, active probing is required. In this case, it is assumed that a set of boundary nodes is able to actively send probe packets to another set of edge nodes in order to measure packet attributes on the end-to-end path. In some examples, the network tomography uses a combination of active and passive probing packets.

In some examples, nodes of the network support protocols for network measurements, like Two-Way Active Measurement Protocol (TWAMP). TWAMP is defined in IETF RFC 5357, and may be used to perform the measurements. Using TWAMP, for example, the end-to-end round-trip delay or the IP Packet loss may be evaluated. Then using NT it is possible to correlate all the information obtained at the edge nodes (end nodes of the monitored path) to infer information about the performance of network internals, i.e. identify a metric of individual links.

The network tomography unit is configured to analyze the probing packets sent (including both passive and active packets). In particular, timing packets containing timing information are used by the network tomography unit to identify links having a performance which causes a problem for use of that timing information. In some examples, the monitored performance indicates an amount of PDV.

The probing paths (including the paths of the timing packets) which are analyzed by the network tomography unit are between two sets of end nodes. In some examples, one set of end nodes, acting as the probe locations, are the timing masters (e.g. PTP masters). Such timing masters, e.g. reference clock 22, may be located in the switch site 20. Alternatively, the timing master or end node may be located in an aggregation site if required. The other set of end nodes are the timing slaves, which in this examples is the radio base stations (RBS) 10. The timing slave is typically integrated in the radio base stations.

The use of the timing packets as network tomography probing packets simplifies the overall handling of the solution and optimizes the bandwidth usage.

In the event that a problem is detected with the synchronization (e.g. PDV is above a threshold), the network tomography unit is configured to start identifying the faulty/congested link. In some examples, the detection of the problem is by the RBS. On detection of the problem, the impacted RBS(s) enters holdover.

The network tomography unit is configured to analyze the network 1. The analysis may comprise generation of unicast paths between the timing Masters and the RBSs. The metric to be measured (e.g. PDV) is correlated, and the link creating issues (e.g. overloaded) is identified using NT.

In some examples, a new path for at least the timing information is determined through the network. The definition of such a new fault-free path may be carried out by the network tomography unit or a different entity, e.g. management entity. In this way it is possible to rearrange the synchronization path to exclude the problem link.

Figure 5:
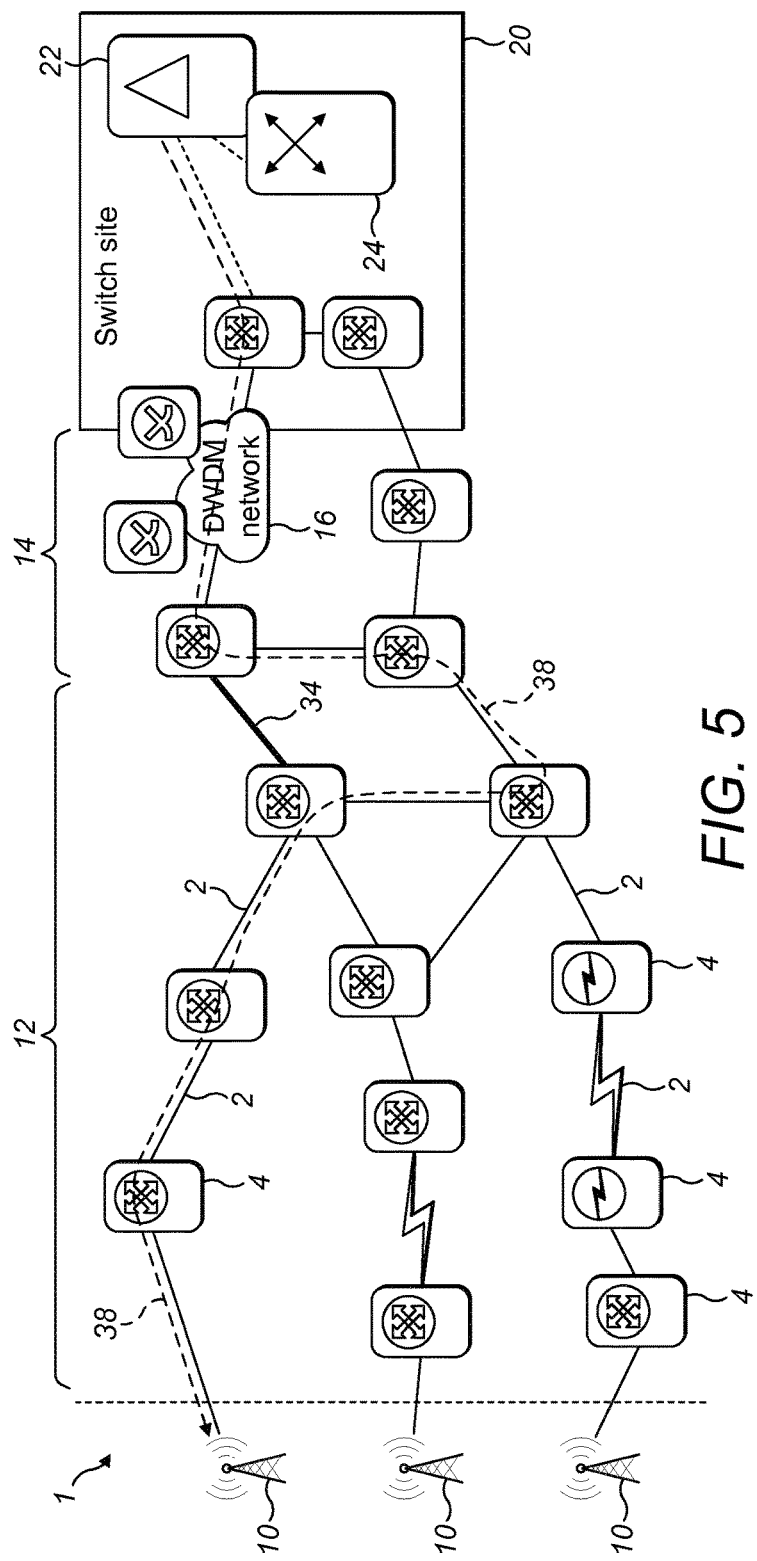
FIG. 5 shows a further example of a network according to an example of the present invention.

FIG. 5 shows an example of the network 1 in which an alternate path 38 has been determined, avoiding the identified link 34. The two-way timing packets carrying timing information are sent on the alternate path 38. Thus, the timing information is transmitted between the reference clock 22 and RBSs 10 on a high performance path, i.e. not suffering from high PDV.

Figure 6:
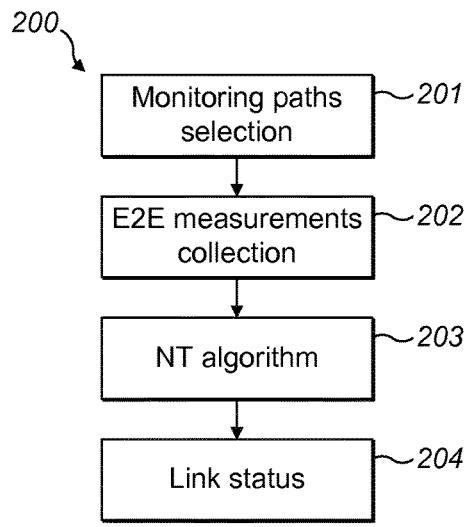
FIG. 6 shows an example method according to an example of the present invention.

FIG. 6 shows example steps of a method 200 according to an example of the invention. In 201, the monitoring paths are selected. The monitoring paths selected allow identification of a metric of each individual link of the network 1. The monitoring paths are selected according to network tomography requirements. In particular, the monitoring paths comprise a number of end-to-end paths which are linearly independent, the number of paths being equal to or greater than the number of links in the network 1 being monitored. The selected monitoring paths define a set selected such that the analyzing provides a determination of a performance of each individual link.

The selection of monitoring paths may be carried out prior to detection of a problem (e.g. on initialization or periodically), and/or after detection of a problem. In some examples, the analyzing is triggered when the performance is determined to be below a threshold.

The problem may be detected by the RBS. The problem may relate to PDV or another identified problem relating to a different metric. The example of PDV is only one possible metric that can cause a problem, and another metric may be used, e.g. latency. The link is identified a link as a problem link when the metric is above or below a threshold, e.g. latency above a threshold time.

The selection of paths may comprise identifying paths used by timing paths, and paths for which additional (active) probing packets need to be sent, in order to send probing packets on all of the set of paths which allows (by NT) a determination of the metric of individual links. In some examples, the selecting of paths is for transmitting probing packets in addition to the timing packets, to complete a set of probing paths required for the analyzing.

In 202, path end-to-end (E2E) measurements are collected, e.g. by the network tomography unit. The end-to-end measurements are a measurement of a metric (e.g. PDV) along an end-to-end path. For example, the end-to-end paths are between the switch site (e.g. reference clock) and one or more RBSs 10. The end-to-end measurements are measurements on packets transmitted through the network 1 along the monitoring paths. The probing packets may be considered as exchanged between monitoring points.

At least some of the packets used for measurements may be timing packets carrying timing information (e.g. PTP or NTP packets) to provide synchronization. Such timing packets may be referred to as passive probing packets. In some examples, at least some of the packets are packets transmitted only for the purpose of making the measurements, i.e. active probing packets. In one example, the packets used are a combination of timing packets and active probing packets. Alternatively, the network tomography unit uses only timing packets as probing packets, or uses only active probing packets.

In 203, the probing packets (of all types used, e.g. active and passive) are analyzed using network tomography. The network tomography algorithm determines a metric or performance individually for each link, e.g. the PDV for each link. The selection of the set of linearly independent paths allows information about individual links to be derived from the analysis of the end-to-end path measurements.

In 204, the link status is determined per link. For example, one or more link is identified as having a problem (e.g. PDV above a threshold).

The identified link(s) are used to calculate an alternative path, at least for the timing information. The alternative path is calculated by a Path Calculation Entity (PCE). The determined information is transmitted to the PCE to re-calculate the path. Alternatively, the alternative path is calculated by the network tomography unit or another logical or physical entity. In some aspects, the method comprises identifying an alternate path 38 for a timing packet, avoiding a link 34 determined to have a performance which is below a threshold.

In some examples, the method 200 is a method of monitoring performance of a network. The method comprises analyzing probing packets sent on a plurality of end-to-end paths over links of the network. At least one analysed probing packet is a timing packet comprising timing information for synchronization. The analyzing comprising analyzing probing packets sent on all of a set of probing paths, the set selected such that the analyzing provides a determination of a performance of each individual link. The method further comprises determining the performance of individual links. In some aspects, the analyzing 203 is by network tomography. The network which is monitored comprises a radio access network 12 and/or aggregation network 14. The analyzing provides for a different path to calculated through the network for the transmission of timing packets for synchronization (e.g. of RBSs 10). For example, the paths on which the probing packets are transmitted are between a reference clock 22 and one or more radio base stations 10.

Figure 7:
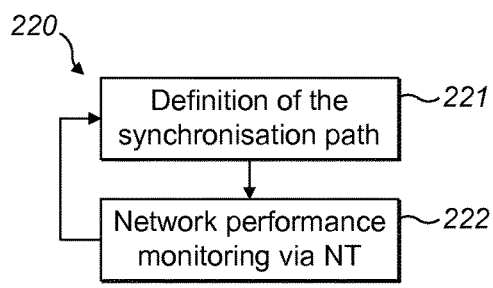
FIG. 7 shows an example method according to a further example of the present invention.

FIG. 7 shows a method 220 according to a further example of the invention.

In 221, the synchronization path is defined. This is the path 30; 38 through the network along which the timing packets carrying timing signals are transmitted.

In 222, the network performance is monitored and evaluated using network tomography. As described above, the network tomography may comprise identifying a complete set of paths needed to identify a metric of each link, and analyzing the metric of each end-to-end path. The evaluation of the end-to-end paths is used to identify the metric of each link. The determination of the link metrics for separate links is used to identify one or more links which has a metric which is considered to not be acceptable, e.g. above or below a threshold. This information on a link to be avoided is passed back to the process of defining the synchronization path. This allows a problematic link to be avoided, and hence the provision of more accurate synchronization information.

Aspects of the invention provide a mechanism to handle packet timing issues caused by high PDV (or other analogous problems such as latency). This allows use of clocks in the RBS which depend more strongly on synchronization from a packet based synchronization technology. For example, the clocks in the RBS have a simplified implementation, e.g. reduced cost. Aspects of the invention relate to synchronization in the mobile backhaul network. Aspects of the invention provide for monitoring performance of this network.

In some examples, the described apparatus and method are integrated in operations and management tools. In some examples, the described solution is integrated in a SDN-based architecture.

In some examples, more than one path is identified for the distribution of the timing to the slave from the same master. The more than one path may be identified by network tomography, e.g. as required by the identifiability problem (independent paths). In this way the slave can for instance use the best reference, for example, the path less impacted by PDV. When all references (paths) are impacted, via network tomography it is possible to identify a new path that would not be impacted by the problem, e.g. excessive PDV.

Aspects of the invention include starting a Network Tomography analysis to identify the critical links/paths. The analysis is started directly following detection of a timing performance degradation or detection that network performance in general is degraded (e.g. PDV threshold alarm). In some examples, this is achieved by generating unicast paths between the Masters and the slaves (as identified by the identifiability analysis) and by collecting information on a metric of the paths, e.g. PDV data.

Examples of the invention perform PDV measurement correlation and identification of the link creating issues (e.g. overloaded). The analysis is performed using the timing packets with no (or reduced) need to generate ad hoc traffic.

In examples of the invention, active probing is used to set up all the probing connections needed, independently from the native routing matrix. In some examples, the selected probing paths are on a connection orientated network. Aspects of the invention apply to networks where paths are selected by a network management (e.g. MPLS, GMPLS).

Figure 8:
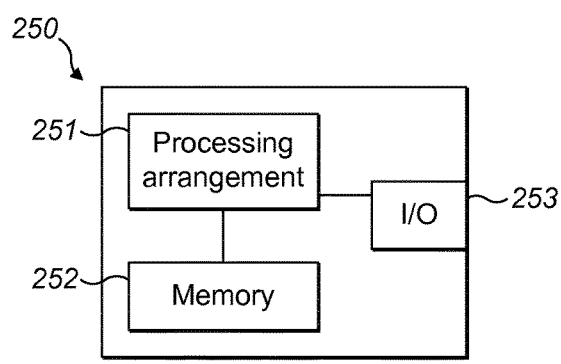
FIG. 8 is a block diagram depicting a unit according to an example of the invention.

FIG. 8 shows an example of the network tomography unit 250 or network tomography system. The network tomography unit 250 may be a separate logical or physical entity, or may be considered as part of another entity of the network. For example, the features and units described may be part of one or more entity.

The network tomography unit 250 comprises a processing arrangement 251 and a memory 252. The processing arrangement 251 and memory are configured to execute the process described. The set of linearly independent probing paths are stored in the memory 252. An I/O device 253 provides for receiving of network information (e.g. topology and edge nodes) and/or transmission of the set of determined probing paths for generating such probing packets. In some examples, instructions to send probing packets are sent from the I/O device 253. In some examples, probing packets are received by the I/O device 253. In some aspects, measurements or calculations of link status or parameters are carried out by the network tomography unit 250, e.g. in the processing arrangement 251.

The unit is configured to monitor performance of a network. The unit comprises a processing arrangement configured to analyze probing packets sent on a plurality of end-to-end paths over links of the network, wherein at least one analysed probing packet is a timing packet comprising timing information for synchronization. The processing arrangement is configured to analyze probing packets sent on all of a set of probing paths, the set selected such that the analyzing provides a determination of a performance of each individual link. The unit is configured to determine the performance of individual links. In some examples, the unit is configured to analyse probing packets in a radio access network and/or aggregation network. The determined performance corresponds to the handling of timing packets by the link. In some aspects, the monitored performance of the links corresponds to packet delay variation.

The described functions and modules may be embodied in the processing arrangement 251, for example, a processing arrangement running a computer program. Examples of the invention comprise a computer program, or computer program product, configured to implement the method of any embodiment of the invention.

Aspects of the invention allow implementing centralized remote OAM functionalities, based on end-to-end packet or traffic measurements only. Aspects of the invention provide an automatic technique to find the link which has performance degradation.

Aspects of the invention compute all the paths required to infer network performance, independently of whether active probing or passive probing is to be used in the later probing phase. For active probing, the selected set of probing paths used. If passive probing is used, and it is not the case that all the paths selected by the algorithm are available connections; then in this case it is necessary to send active probing.

Any feature described may or may be considered as wherein at least one analysed probing packet is a timing packet comprising timing information for synchronization.

Any example described may be used in combination with any example or embodiment described. In some examples, the feature that at least one analysed probing packet is a timing packet comprising timing information for synchronization is not an essential feature of the invention. Examples of the invention may utilize only active probing packets, i.e. packets sent only for the purpose of carrying out the network tomography to determine the status of each link. In some examples, an aspect of the invention is a system comprising a transmitter configured to transmit timing packets and/or active probing packets. In some aspects, a system comprises the network tomography unit and a path calculation unit (e.g. PCE) to calculate a different path for the timing (synchronization) packets based on the determination of link metrics performed by the network tomography unit.

The invention claimed is:

1. A method of monitoring performance of a network, the method comprising:
   analyzing probing packets sent on a plurality of end-to-end paths over links of the network,
   wherein at least one analyzed probing packet is a timing packet comprising timing information for synchronization, wherein the analyzing comprises analyzing path-level measurements for the probing packets sent on all of a set of probing paths, and wherein the set of probing paths is selected such that the analyzing of the path-level measurements provides a determination of a performance of each and every individual link in the set of probing paths;
   determining the performance of individual links from the path-level measurements;
   identifying an alternate path for a next timing packet, to avoid a link in the set of probing paths where the determined performance of the link is below a threshold; and
   transmitting the next timing packet over the identified alternate path.

2. The method of claim 1, wherein the analyzing is by network tomography.

3. The method of claim 1, wherein the network comprises a radio access network and/or an aggregation network.

4. The method of claim 1, further comprising selecting the set of probing paths for transmitting the probing packets in addition to timing packets.

5. The method of claim 1, wherein the determined performance of the individual links corresponds to the handling of timing packets by the individual links.

6. The method of claim 1, wherein the determined performance of the individual links corresponds to packet delay variation.

7. The method of claim 1, wherein the set of probing paths comprises probing paths which are linearly independent, and a number of the linearly independent probing paths is equal to or greater than a number of links in the network.

8. The method of claim 1, wherein the set of probing paths on which the probing packets are transmitted are between a reference clock and one or more radio base stations.

9. An apparatus configured to monitor performance of a network, the apparatus comprising:
   a processing circuit configured to:
      analyze probing packets sent on a plurality of end-to-end paths over links of the network, wherein at least one analyzed probing packet is a timing packet comprising timing information for synchronization,
      analyze path-level measurements for probing packets sent on all of a set of probing paths, wherein the set of probing paths is selected such that the analysis of the path-level measurements provides a determination of a performance of each and every individual link in the set of probing paths,
      determine the performance of individual links from the path-level measurements,
      identify an alternate path for a next timing packet, to avoid a link in the set of probing paths where the determined performance of the link is below a threshold, and
      transmit the next timing packet over the identified alternate path.

10. The apparatus of claim 9, wherein the apparatus is configured to analyze probing packets in a radio access network and/or an aggregation network.

11. The apparatus of claim 9, wherein the determined performance of the individual links corresponds to the handling of timing packets by the individual links.

12. The apparatus of claim 9, wherein the determined performance of the individual links corresponds to packet delay variation.

13. A non-transitory computer-readable medium comprising, stored thereupon, a computer program product comprising computer program instructions configured for execution on a processing circuit and to cause the processing circuit to monitor performance of a network by:
   analyzing probing packets sent on a plurality of end-to-end paths over links of the network, wherein at least one analyzed probing packet is a timing packet comprising timing information for synchronization, wherein the analyzing comprises analyzing path-level measurements for the probing packets sent on all of a set of probing paths, and wherein the set of probing paths is selected such that the analyzing of the path-level measurements provides a determination of a performance of each and every individual link in the set of probing paths;

determining the performance of individual links from the path-level measurements;

identifying an alternate path for a next timing packet, to avoid a link in the set of probing paths where the determined performance of the link is below a threshold; and transmitting the next timing packet over the identified alternate path.

* * * * *